United States Patent
Tanaka et al.

(10) Patent No.: US 10,720,868 B2
(45) Date of Patent: Jul. 21, 2020

(54) MOTOR CONTROL DEVICE

(71) Applicant: OMRON Corporation, Kyoto (JP)

(72) Inventors: Masahito Tanaka, Kyoto (JP); Yasushi Ono, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/354,212

(22) Filed: Mar. 15, 2019

(65) Prior Publication Data

US 2020/0014319 A1     Jan. 9, 2020

(30) Foreign Application Priority Data

Jul. 3, 2018 (JP) ................. 2018-126828

(51) Int. Cl.
*H02P 21/00* (2016.01)
*H02P 21/16* (2016.01)
*H02P 21/18* (2016.01)
*H02P 21/22* (2016.01)

(52) U.S. Cl.
CPC .............. *H02P 21/16* (2016.02); *H02P 21/18* (2016.02); *H02P 21/22* (2016.02)

(58) Field of Classification Search
CPC ........... H02P 21/18; H02P 21/22; H02P 23/14
See application file for complete search history.

(56) References Cited

U.S. PATENT DOCUMENTS

2019/0285698 A1* 9/2019 Hayashi ............... G01R 31/346

FOREIGN PATENT DOCUMENTS

| EP | 2626996 | 8/2013 |
|---|---|---|
| EP | 2626997 | 8/2013 |
| EP | 2741416 | 6/2014 |
| JP | H0928198 | 2/1997 |
| JP | 2001069782 | 3/2001 |

OTHER PUBLICATIONS

"Search Report of Europe Counterpart Application", dated May 3, 2019, p. 1-p. 8.

* cited by examiner

*Primary Examiner* — Karen Masih
(74) *Attorney, Agent, or Firm* — JCIPRNET

(57) ABSTRACT

Provided is a motor control device having a function of estimating inductance and resistance of a motor for which inductance and resistance thereof are unknown. The motor control device includes a power converter, a current controller which calculates the voltage command input to the power converter using a detection result of a current value of a drive current of the motor, a current command generation unit which specifies a frequency for motor constant calculation on the basis of an electrical time constant of the motor, generates a sine wave of the frequency for motor constant calculation, and inputs the sine wave to the current controller as the current command, and a motor constant calculation unit which obtains a frequency response while the sine wave is input to the current controller as the current command, and calculates resistance and inductance of the motor from the obtained frequency response.

7 Claims, 4 Drawing Sheets

MOTOR CONTROL DEVICE

CROSS-REFERENCE TO RELATED APPLICATION

This application claims the priority of Japan patent application serial no. 2018-126828, filed on Jul. 3, 2018. The entirety of the above-mentioned patent application is hereby incorporated by reference herein and made a part of this specification.

BACKGROUND

Technical Field

The disclosure relates to a motor control device.

Description of Related Art

In order to satisfactorily control a motor with a motor control device, a motor constant (inductance, resistance, or the like) of the motor is necessary. Also, a motor constant of a motor varies depending on a temperature of the motor or a current flowing through the motor. Therefore, various technologies for estimating a motor constant have been developed. For example, a technology for estimating d-axis and q-axis inductance according to a current flowing through a motor with known motor resistance from various voltages and currents when a pulse voltage is applied to the d-axis and q-axis has been developed (see, for example, Patent Document 1). Further, a technology for estimating d-axis and q-axis inductance according to a current flowing through a motor and a temperature of the motor from various voltages and currents when high-frequency components are superimposed on a d-axis current command and a q-axis current command has also been developed (see, for example, Patent Document 2).

PATENT DOCUMENTS

[Patent Document 1] Japanese Patent Laid-Open No. 2001-69782
[Patent Document 2] Japanese Patent Laid-Open No. H9-28198

If a motor constant of a motor in a predetermined state is known, when the motor constant is further corrected through technology such as that described above after a setting according to the motor constant is performed with respect to the motor control device, the motor can be more satisfactorily controlled. However, there are cases in which a motor constant (inductance and resistance) of a motor controlled by a motor control device is not known at all. When a motor constant of a motor is unknown, it is necessary to perform complicated work for estimating the motor constant of the motor.

SUMMARY

A motor control device which controls a motor according to one embodiment of the disclosure includes: a power converter which applies a voltage to the motor according to an voltage command input to the power converter; a current controller which calculates the voltage command input to the power converter using a detection result of a current value of a drive current of the motor so that a current value specified by an current command input to the current controller coincides with the current value of the drive current of the motor; a current command generation unit which specifies a frequency for motor constant calculation on the basis of an electrical time constant of the motor, generates a sine wave of the frequency for motor constant calculation, and inputs the sine wave to the current controller as the current command; and a motor constant calculation unit which obtains a frequency response in which the voltage command and the current value of the drive current of the motor are an input and an output respectively while the sine wave is input to the current controller by the current command generation unit as the current command, and calculates resistance and inductance of the motor from the obtained frequency response.

DESCRIPTION OF THE EMBODIMENTS

Figure 1:
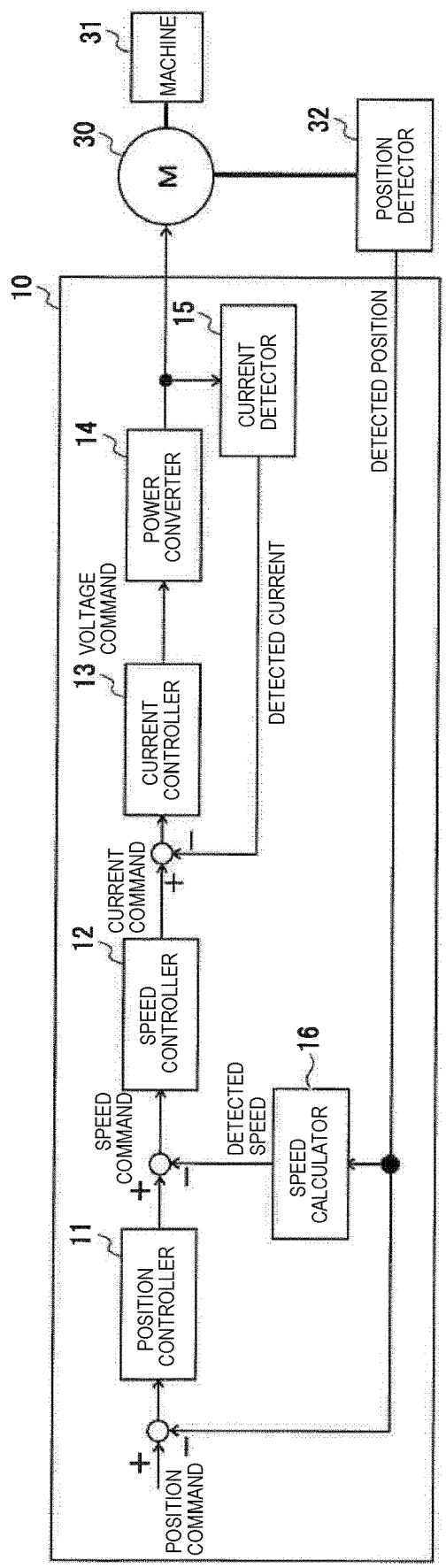
FIG. 1 is an explanatory diagram of a motor control function of a motor control device according to an embodiment of the disclosure.

The disclosure has been made in view of the above problems, and it is an objective of the disclosure to provide a motor control device having a function of estimating inductance and resistance of a motor for which inductance and resistance are unknown.

That is, although the resistance and inductance of the motor can basically be obtained from the frequency response in which the voltage command and the current value of the drive current of the motor are an input and an output respectively while the sine wave is input to the current controller as the current command, calculation accuracy (estimation accuracy) of the inductance deteriorates when the frequency of the sine wave as the current command input to the current controller is excessively low. Also, although calculation accuracy (estimation accuracy) of the resistance deteriorates when the frequency of the sine wave is excessively high, when the frequency response for calculating the resistance and inductance of the motor is obtained, the sine wave of the frequency for motor constant calculation specified on the basis of the electrical time constant of the motor is input to the current controller as a current command in the motor control device. Therefore, according to this motor control device, it is possible to accurately estimate (calculate) inductance and resistance of the motor for which inductance and resistance are unknown.

The current command generation unit of the motor control device may specify the reciprocal of the electrical time constant of the motor as the frequency for motor constant calculation. Also, the current command generation unit may specify a frequency near the reciprocal of the electrical time constant of the motor (for example, a value within a predetermined frequency range including the reciprocal of the electrical time constant) as the frequency for motor constant calculation.

In order to prevent deterioration in identification accuracy of the inductance and resistance of the motor due to an influence of feedback control of the current control loop, a configuration in which "the current command generation unit causes a frequency band of a current control loop including the power converter and the current controller to be lower than the frequency for motor constant calculation, then generates the sine wave of the frequency for motor constant calculation, and inputs the sine wave to the current controller as the current command" may be employed for the motor control device.

In order to obtain the resistance and inductance of the motor in various driving currents, a configuration in which "the current command generation unit inputs a plurality of sine waves of the frequency for motor constant calculation having different amplitudes from each other one by one to the current controller as the current command, and the motor constant calculation unit calculates the resistance and inductance of the motor for each of the plurality of sine waves" may be employed for the motor control device.

Further, a configuration in which "an estimator which obtains the frequency response with the voltage command and the current value of the drive current of the motor as an input and an output, respectively, within a predetermined frequency range when the current command which causes a voltage equal to or lower than a specified voltage which has been predetermined as a voltage at which a current does not excessively flow to the motor to be applied to the motor regardless of specifications of the motor is input to the current controller, and estimates the electrical time constant of the motor from the obtained frequency response is further included, in which the current command generation unit specifies the frequency for motor constant calculation on the basis of the electrical time constant of the motor estimated by the estimator" may be employed for the motor control device. When this configuration is employed, it is possible to estimate inductance and resistance of the motor for which an electrical time constant, inductance, and resistance are unknown.

According to the disclosure, it is possible to estimate inductance and resistance of a motor for which inductance and resistance are unknown.

Hereinafter, an embodiment of the disclosure will be described with reference to the drawings.

Figure 2:
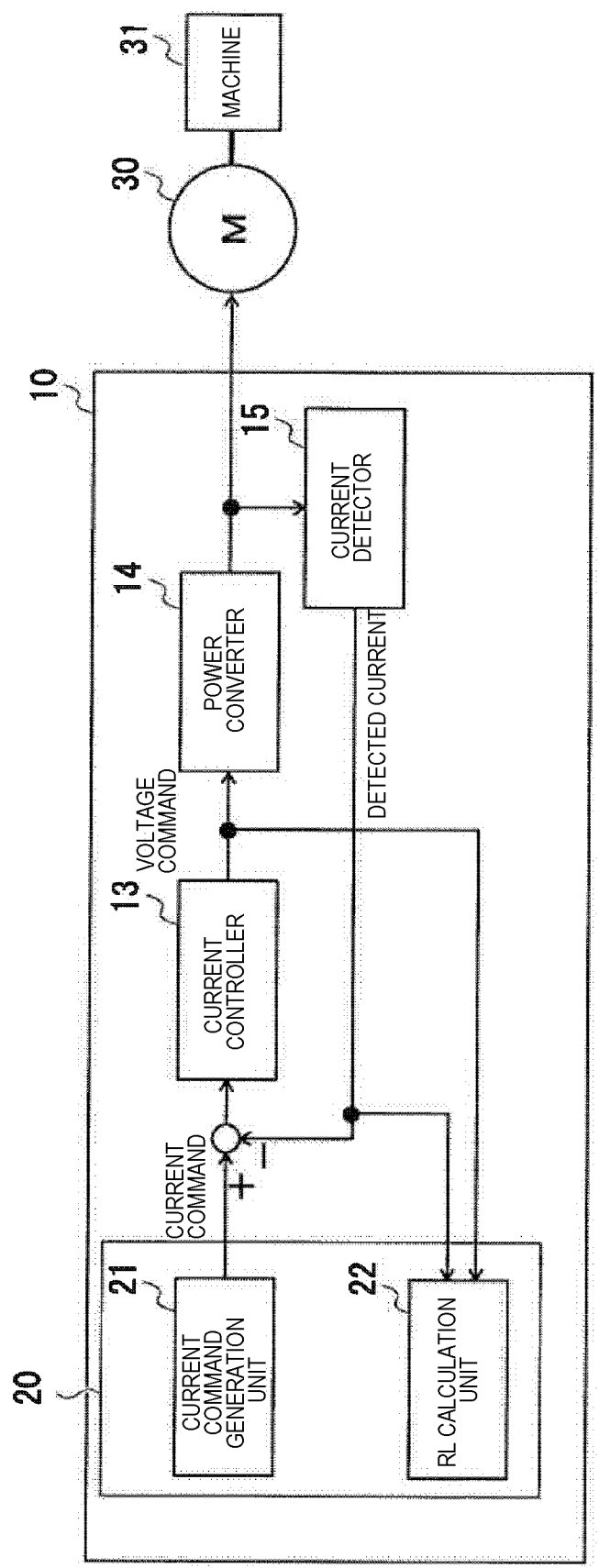
FIG. 2 is an explanatory diagram of a motor constant calculation function of the motor control device according to the embodiment.

FIGS. 1 and 2 are explanatory diagrams of a motor control function and a motor constant calculation function of a motor control device 10 according to an embodiment of the disclosure, respectively.

The motor control device 10 according to the present embodiment is obtained by adding a function for calculating inductance and resistance of an alternating current (AC) servomotor (hereinafter simply referred to as a motor) 30 (FIG. 2) to a device for controlling the motor 30 connected to a machine 31 (FIG. 1).

First, the motor control function of the motor control device 10 will be described. As shown in FIG. 1, when the motor 30 is controlled, the motor control device 10 operates as a device in which a position controller 11, a speed controller 12, a current controller 13, a power converter 14, a current detector 15, and a speed calculator 16 are included. Respective parts shown in FIG. 1 are units that operate as follows.

The position controller 11 calculates a speed command by multiplying a deviation between a position command input from an upper level device (not shown) such as a programmable logic controller (PLC) and a position of the motor 30 detected by a position detector 32 (hereinafter referred to as a detected position) attached to the motor 30 by a position proportional gain. The speed calculator 16 calculates a speed (hereinafter referred to as a detected speed) by differentiating the detected position with time.

The speed controller 12 multiplies an integration quantity of a deviation between the speed command calculated by the position controller 11 and the detected speed by a speed integral gain, and multiplies a sum of the above calculation result and the speed deviation by a speed proportional gain to calculate a current command.

The current controller 13 generates a voltage command according to a deviation between the current command calculated by the speed controller 12 and an amount of a current actually flowing through the motor 30 detected by the current detector 15 (hereinafter referred to as a detected current). As the current controller 13, a proportional integral (PI) controller is normally used. The power converter 14 is a unit for amplifying the voltage command from the current controller 13 and applying the amplified voltage command to the motor 30.

Hereinafter, the motor constant calculation function of the motor control device 10 will be described.

As described above, the motor control device 10 is a device that performs current control when the motor 30 is controlled. Although accurate values of resistance and inductance of the motor 30 are necessary to perform high-precision current control, there are cases in which the resistance and inductance of the motor 30 are not known at all. In such a case, a function used to obtain the resistance and inductance of the motor 30 is the motor constant calculation function.

As shown in FIG. 2, the motor constant calculation function of the motor control device 10 is realized by a motor constant estimator 20 including a current command generation unit 21 and an RL (resistance and inductance) calculation unit 22, the current controller 13, the power converter 14, and the current detector 15.

The motor constant estimator 20 has first to third operation modes as operation modes. Hereinafter, an operation of the motor constant estimator 20 in each mode will be described.

[First Operation Mode]

The first operation mode is a mode that can be utilized by a user when an electrical time constant of the motor 30 is known.

When the motor constant estimator 20 is operated in the first operation mode, the user performs a predetermined manipulation including an input manipulation of the electrical time constant of the motor 30 with respect to an upper level device connected to the motor control device 10 (hereinafter expressed as a first manipulation). When the first manipulation is performed, the upper level device notifies the motor constant estimator 20 of the electrical time constant input by the user, and the motor constant estimator 20 starts an operation in the first operation mode.

When the motor constant estimator 20 starts the operation in the first operation mode, the current command generation unit 21 calculates the reciprocal of the electrical time constant input by the user as a frequency for motor constant calculation. Next, the current command generation unit 21 determines whether or not a present band frequency of a current control loop in which the current controller 13 or the like is included is equal to or higher than the frequency for motor constant calculation.

When a present band frequency of the current control loop is equal to or higher than the frequency for motor constant calculation, the current command generation unit 21 changes a control parameter (PI gain) of the current controller 13 so that the band frequency of the current control loop is lower than the frequency for motor constant calculation. Thereafter, the current command generation unit 21 performs current command input processing for inputting a sine wave of a predetermined amplitude of the frequency for motor constant calculation into the current control loop as a current command during a predetermined time. Further, inputting a sine wave into the current control loop means inputting the sine wave to a differential unit in a stage ahead of the current controller 13.

On the other hand, when the present band frequency of the current control loop is lower than the frequency for motor constant calculation, the current command generation unit 21 performs the above-described current command input processing without changing the control parameter of the current controller 13.

While the current command generation unit 21 performs the above-described current command input processing, the RL calculation unit 22 collects voltage commands and detected currents. When the current command input processing is completed, the RL calculation unit 22 obtains a frequency response with the voltage command and the detected current as an input and an output respectively on the basis of the collected information. Next, the RL calculation unit 22 calculates resistance R and inductance L of the motor 30 from the obtained frequency response by the following Equations (1) and (2).

[Expression 1]

$$R = \frac{1}{G(\omega)\sqrt{1 + (\tan P(\omega))^2}} \quad \text{Equation (1)}$$

$$L = -\frac{R \tan P(\omega)}{\omega} \quad \text{Equation (2)}$$

Here, $\omega$ is the frequency for motor constant calculation, and $P(\omega)$ and $G(\omega)$ are respectively a gain and a phase obtained as the above-described frequency response. The above-described Equations (1) and (2) are obtained by assuming the following motor model.

[Expression 2]

$$\frac{1}{Ls + R}$$

When the calculation of the resistance and inductance of the motor 30 by the RL calculation unit 22 is completed, the motor constant estimator 20 transmits the calculated resistance and inductance to the upper level device as a processing result and then ends the operation in the first operation mode.

[Second Operation Mode]

The second operation mode is a mode that can also be utilized by the user when the electrical time constant of the motor 30 is known.

When the motor constant estimator 20 is operated in the second operation mode, the user performs a predetermined manipulation including an input manipulation of the electrical time constant of the motor 30 and one or more specified drive current values with respect to the upper level device (hereinafter expressed as a second manipulation). When the second manipulation is performed, the upper level device notifies the motor constant estimator 20 of each of the values input by the user, and the motor constant estimator 20 starts an operation in the second operation mode.

When the motor constant estimator 20 starts the operation in the second operation mode, the current command generation unit 21 calculates the reciprocal of the electrical time constant input by the user as the frequency for motor constant calculation. Next, the current command generation unit 21 determines whether or not the present band frequency of the current control loop in which the current controller 13 or the like is included is equal to or higher than the frequency for motor constant calculation. Then, only when the present band frequency of the current control loop is equal to or higher than the frequency for motor constant calculation, the current command generation unit 21 changes the control parameter of the current controller 13 so that the band frequency of the current control loop is lower than the frequency for motor constant calculation.

Thereafter, for each specified drive current value input by the user, the current command generation unit 21 performs the current command input processing for inputting a sine wave of the frequency for motor constant calculation, an amplitude of which is determined so that a time average value of a current flowing through the motor coincides with the specified drive current value, into the current control loop as a current command during a predetermined time.

Also, when the motor constant estimator 20 operates in the second operation mode, the RL calculation unit 22 collects voltage commands and detected currents for each current command input processing performed by the current command generation unit 21, obtains the frequency response with the voltage command and the detected current as an input and an output, respectively, on the basis of the collected information, and then calculates the resistance and inductance of the motor 30 from the obtained frequency response. Then, when the processing by the RL calculation unit 22 with respect to all the current command input processing is completed, the motor constant estimator 20 transmits each (every) pair of the resistance and inductance calculated by the RL calculation unit 22 to the upper level device as a processing result and then ends the operation in the second operation mode.

[Third Operation Mode]

The third operation mode is normally utilized when the electrical time constant of the motor 30 is unknown.

When the motor constant estimator 20 is operated in the third operation mode, the user performs a predetermined manipulation to instruct the upper level device to start an operation in the third operation mode (hereinafter expressed as a third manipulation). When the third operation is performed, the upper level device instructs the motor constant estimator 20 to start the operation in the third operation mode, and the motor constant estimator 20 starts the operation in the third operation mode.

When the motor constant estimator 20 starts the operation in the third operation mode, in a state in which only a voltage equal to or less than a specified voltage that has been predetermined as a voltage at which a current does not excessively flow to the motor 30 is applied to the motor 30 regardless of specifications of the motor 30, the current command generation unit 21 and the RL calculation unit 22 performs processing for measuring the frequency response with the voltage command and the detected current as an input and an output, respectively, within a predetermined frequency range (for example, several Hz to several kHz). Further, the above-described specified voltage may be a predetermined voltage of about several volts, or may be a value obtained from a power supply voltage of the motor control device 10 (for example, power supply voltage×5%).

The RL calculation unit 22 that has completed the measurement of the above-described frequency response calculates the inductance and resistance of the motor 30 from the gain and the phase at several frequencies of the measured frequency response. Next, the RL calculation unit 22 calculates one set of the inductance and resistance from the calculation result of a plurality of sets of the inductance and resistance by a predetermined processing (for example, processing of removing abnormal values and then taking an average). Then, the RL calculation unit 22 calculates the electrical time constant of the motor 30 from the calculation result of the one set of the inductance and resistance.

When the calculation of the electrical time constant of the motor 30 in the above-described procedure is completed, the current command generation unit 21 and the RL calculation unit 22 performs processing different from that of the current command generation unit 21 and the RL calculation unit 22 in the above described first operation mode only in that the electrical time constant used for calculating the frequency for motor constant calculation is not input by the user. Then, the motor constant estimator 20 transmits the calculated resistance and inductance to the upper level device as a processing result and then ends the operation in the third operation mode.

Figure 3:
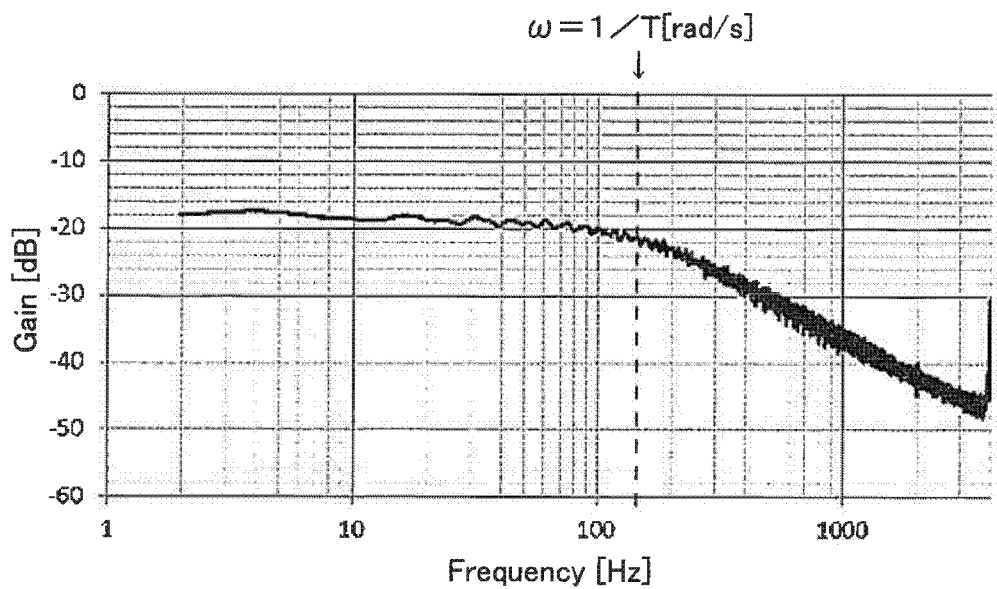
FIG. 3 is a gain diagram with a voltage command and a detected current as an input and an output, respectively.

As described above, the motor control device 10 according to the present embodiment is basically a device for obtaining the resistance and inductance of the motor 30 from the frequency response in which the voltage command and the detected current are an input and an output respectively while the sine wave is input to the current controller 13 as the current command. The frequency response (gain diagram) with the voltage command and the detected current as an input and an output, respectively, is as shown in FIG. 3. Accordingly, when the frequency of the sine wave input to the current controller 13 as the current command is excessively low, calculation accuracy (estimation accuracy) of the inductance deteriorates. Also, although calculation accuracy (estimation accuracy) of the resistance deteriorates when the frequency of the sine wave is excessively high, the motor control device 10 is configured so that the frequency of the sine wave input to the current controller 13 as the current command is the reciprocal of the electrical time constant of the motor 30 (T in FIG. 3). Accordingly, the calculation results of the resistance and inductance of the motor 30 by the motor control device 10 is accurate. On the basis of the calculated resistance R and inductance L of the motor 30, for example, when a calculated proportional gain Kp and an integral gain Ki of the current controller 13 are set to the following values, the motor 30 can be satisfactorily controlled.

$$Kp = Wc \times L \quad \text{Equation (3)}$$

$$Ki = R/L \quad \text{Equation (4)}$$

Further, Wc in Expression (3) is a predetermined proportionality coefficient.

Figure 4:
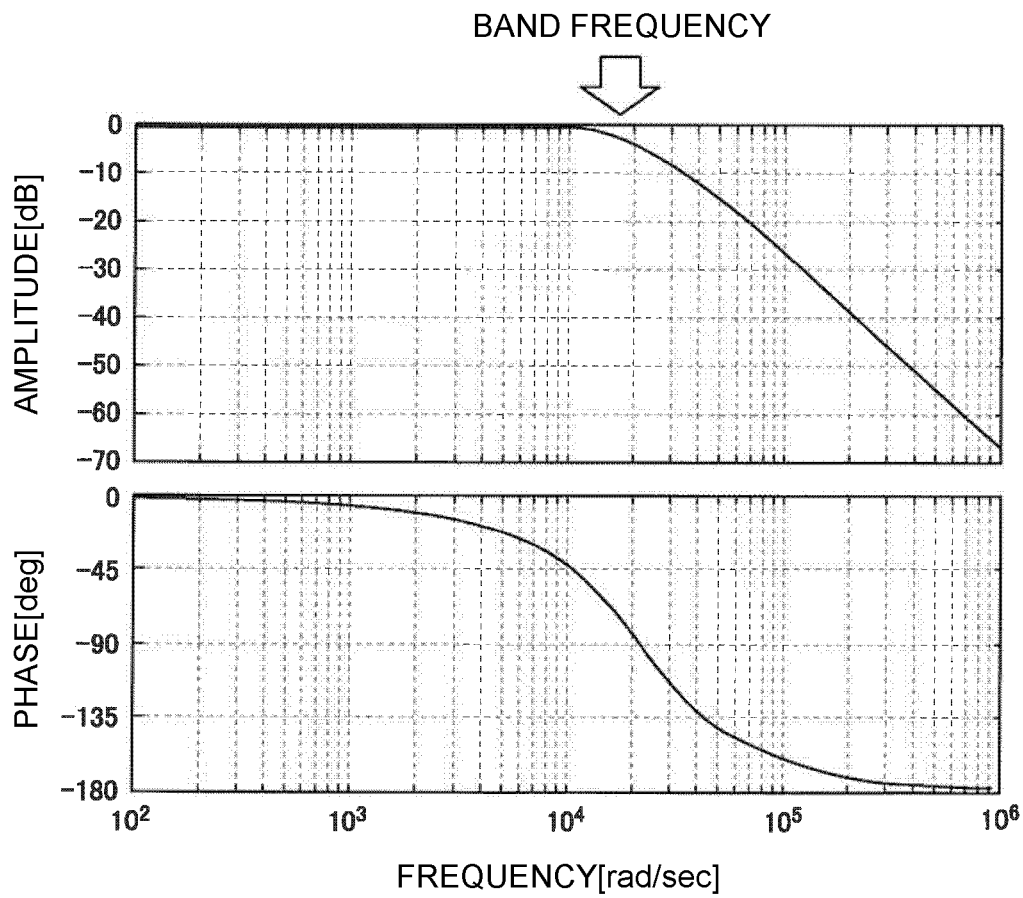
FIG. 4 is a Bode diagram of a current control loop.

Also, the frequency response (Bode diagram) of the current control loop of the motor control device 10 is as shown in FIG. 4. Therefore, when "frequency for motor constant measurement<band frequency of current control loop" is satisfied, although the deviation input to the current controller 13 is close to "0" and identification accuracy of the resistance and inductance of the motor 30 deteriorates, the motor control device 10 has a function of changing the band frequency of the current control loop to be equal to or less than the frequency for motor constant measurement. Accordingly, according to the motor control device 10, a decrease in identification accuracy due to the deviation input to the current controller 13 being close to "0" can also be inhibited.

Figure 5:
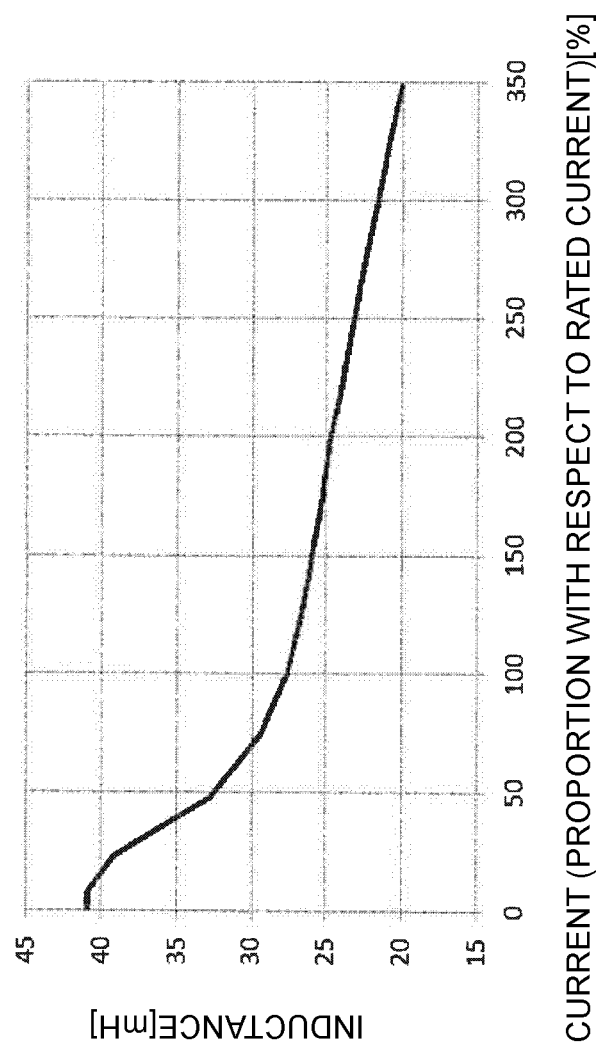
FIG. 5 is an explanatory diagram of current dependence of inductance.

Also, the inductance of the motor 30 is changed by a current flowing through the motor 30 as shown in FIG. 5. When the motor constant estimator 20 is operated in the second operation mode, the inductance and resistance of the motor 30 at each current value can be calculated (estimated). Accordingly, according to the motor control device 10, it is also possible to change the parameter of the current controller 13 according to a drive current of the motor 30.

Further, when the motor constant estimator 20 of the motor control device 10 is operated in the third operation mode, the resistance and inductance of the motor 30 for which the electrical time constant is unknown can be estimated. Also, in the third operation mode, a low voltage only is applied to the motor 30. Accordingly, occurrence of a phenomenon in which an excessive current flows to the motor 30 having a low resistance can be prevented from occurring.

<Modification>

Modifications of various types can be performed for the motor control device 10 described above. For example, the motor control device 10 may be modified to a device that automatically changes the control parameter of the current controller 13 on the basis of the calculation result of the resistance and inductance of the motor 30. Further, when the control parameter of the current controller 13 is automatically changed to the calculation result of the resistance and the inductance in the second operation mode, values of the resistance and inductance (see Equations (3) and (4)) may be configured to be changed according to the current value in addition to a table in which the resistance and inductance calculated for each current value are stored being added to the motor control device 10.

Further, the frequency for motor constant calculation may need only be a value near the reciprocal of the electrical time constant of the motor 30. The frequency for motor constant calculation may be determined for each range (segment) of the reciprocal of the electrical time constant in advance so that the frequency for motor constant calculation associated with a range including the reciprocal of the electrical time constant may be used.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

<Additional Statement>

A motor control device (10) which controls a motor (30), including:

a power converter (14) which applies a voltage to the motor according to an voltage command input to the power converter (14);

a current controller (13) which calculates the voltage command input to the power converter (14) using a detection result of a current value of a drive current of the motor so that a current value specified by an current command input to the current controller (13) coincides with a current value of a drive current of the motor;

a current command generation unit (21) which specifies a frequency for motor constant calculation on the basis of an electrical time constant of the motor (30), generates a sine wave of the frequency for motor constant calculation, and inputs the sine wave to the current controller (13) as the current command; and a motor constant calculation unit (22) which obtains a frequency response in which the voltage command and the current value of the drive current of the motor (30) are an input and an output respectively while the sine wave is input to the current controller (13) by the current command generation unit (21) as the current command, respectively, and calculates resistance and inductance of the motor (30) from the obtained frequency response.

What is claimed is:

1. A motor control device which controls a motor, comprising:
   a power converter which applies a voltage to the motor according to a voltage command input to the power converter;
   a current controller which calculates the voltage command input to the power converter using a detection result of a current value of a drive current of the motor so that a current value specified by a current command input to the current controller coincides with the current value of the drive current of the motor;
   a current command generation unit which specifies a frequency for motor constant calculation on basis of an electrical time constant of the motor, generates a sine wave of the frequency for motor constant calculation, and inputs the sine wave to the current controller as a current command; and
   a motor constant calculation unit which obtains a frequency response in which the voltage command and the current value of the drive current of the motor are an input and an output, respectively, while the sine wave is input to the current controller by the current command generation unit as the current command, and calculates resistance and inductance of the motor from the obtained frequency response,
   wherein the current command generation unit specifies the reciprocal of the electrical time constant of the motor as the frequency for motor constant calculation.

2. The motor control device according to claim 1, wherein the current command generation unit causes a frequency band of a current control loop including the power converter and the current controller to be lower than the frequency for motor constant calculation, then generates the sine wave of the frequency for motor constant calculation, and inputs the sine wave to the current controller as the current command.

3. The motor control device according to claim 1, wherein the current command generation unit inputs a plurality of sine waves of the frequency for motor constant calculation having different amplitudes from each other one by one to the current controller as the current command, and
   the motor constant calculation unit calculates the resistance and inductance of the motor for each of the plurality of sine waves.

4. The motor control device according to claim 2, wherein the current command generation unit inputs a plurality of sine waves of the frequency for motor constant calculation having different amplitudes from each other one by one to the current controller as the current command, and
   the motor constant calculation unit calculates the resistance and inductance of the motor for each of the plurality of sine waves.

5. The motor control device according to claim 1, further comprising:
   an estimator which obtains the frequency response with the voltage command and the current value of the drive current of the motor as an input and an output, respectively, within a predetermined frequency range when the current command which causes a voltage equal to or lower than a specified voltage which has been predetermined as a voltage at which a current does not excessively flow to the motor to be applied to the motor regardless of specifications of the motor is input to the current controller, and estimates the electrical time constant of the motor from the obtained frequency response,
   wherein the current command generation unit specifies the frequency for motor constant calculation on the basis of the electrical time constant of the motor estimated by the estimator.

6. The motor control device according to claim 2, further comprising:
   an estimator which obtains the frequency response with the voltage command and the current value of the drive current of the motor as an input and an output, respectively, within a predetermined frequency range when the current command which causes a voltage equal to or lower than a specified voltage which has been predetermined as a voltage at which a current does not excessively flow to the motor to be applied to the motor regardless of specifications of the motor is input to the current controller, and estimates the electrical time constant of the motor from the obtained frequency response,
   wherein the current command generation unit specifies the frequency for motor constant calculation on the basis of the electrical time constant of the motor estimated by the estimator.

7. The motor control device according to claim 3, further comprising:
   an estimator which obtains the frequency response with the voltage command and the current value of the drive current of the motor as an input and an output, respectively, within a predetermined frequency range when the current command which causes a voltage equal to or lower than a specified voltage which has been predetermined as a voltage at which a current does not excessively flow to the motor to be applied to the motor regardless of specifications of the motor is input to the current controller, and estimates the electrical time constant of the motor from the obtained frequency response,
   wherein the current command generation unit specifies the frequency for motor constant calculation on the basis of the electrical time constant of the motor estimated by the estimator.

* * * * *